(No Model.) 2 Sheets—Sheet 1.
P. PEARSON.
Apparatus for Roasting Coffee.
No. 239,269. Patented March 22, 1881.
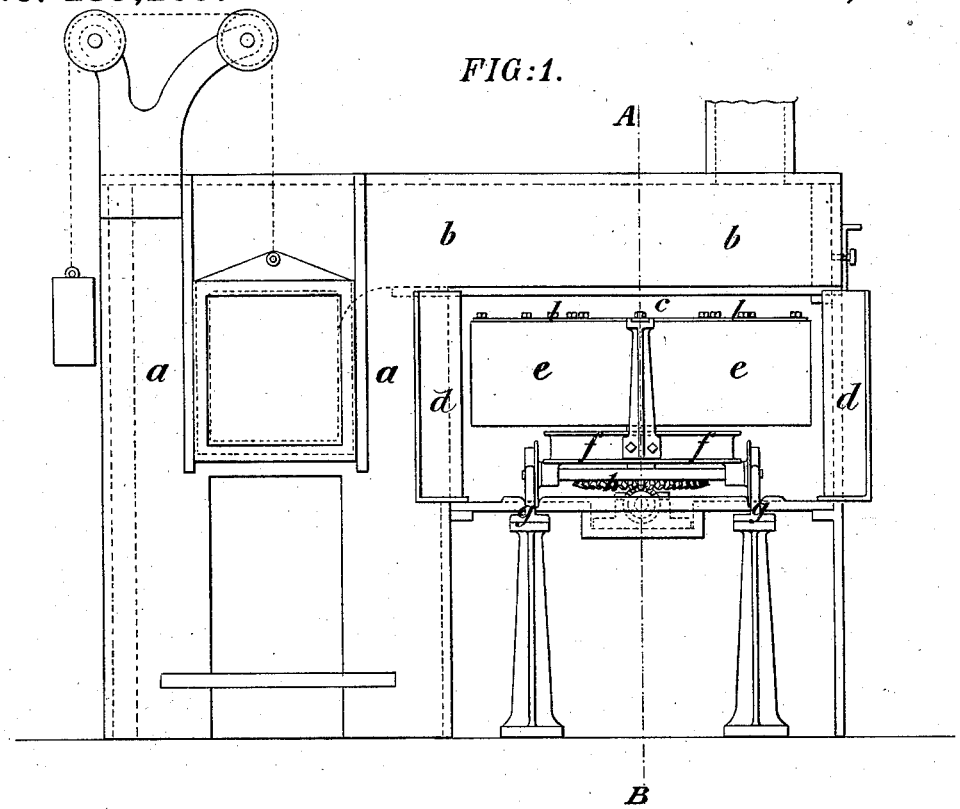
FIG:1.
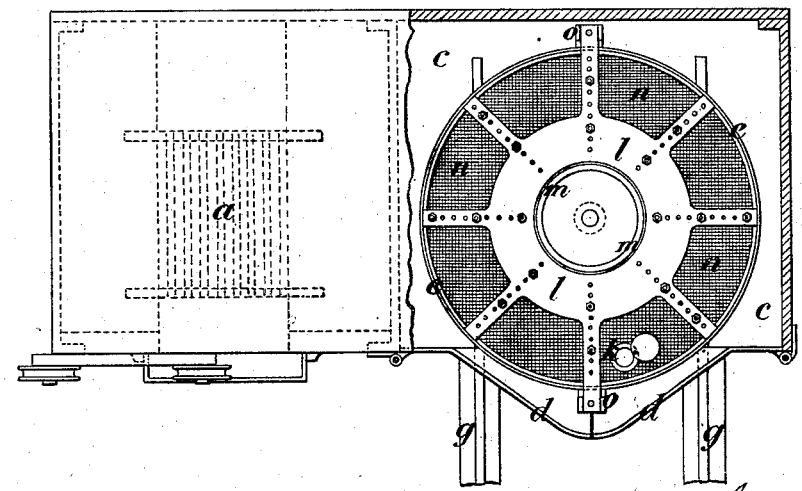
FIG:2.
Witnesses
James F. Tobin
D. Williams
Inventor
Peter Pearson
by his attorneys
Howson and Son (No Model.) 2 Sheets—Sheet 2.
P. PEARSON.
Apparatus for Roasting Coffee.
No. 239,269. Patented March 22, 1881.
FIG: 3.
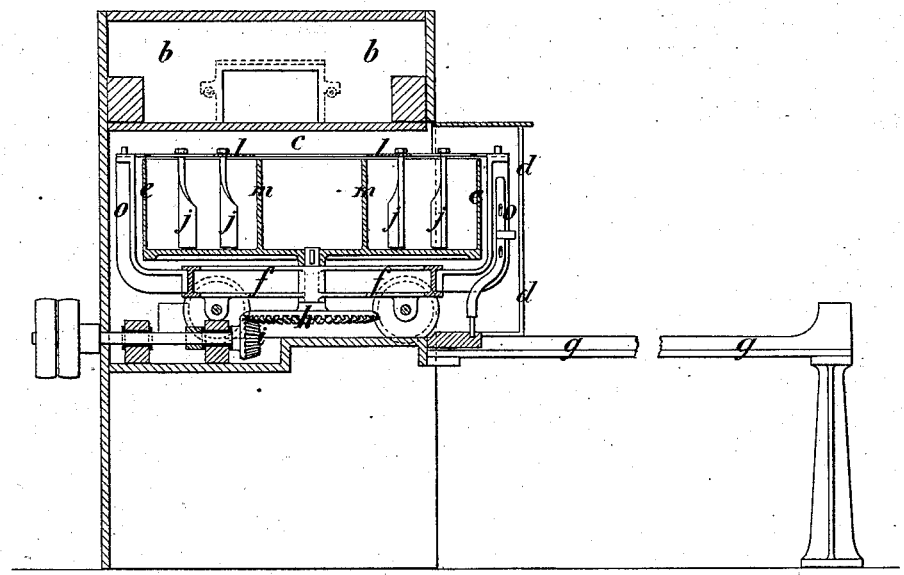
FIG: 4.
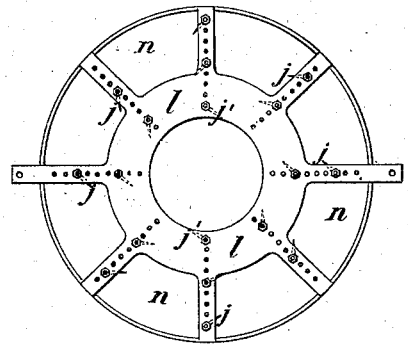
Witnesses:
James T. Tobin.
D. Williams
Inventor
Peter Pearson
by his Attorneys.
Howson and Son

UNITED STATES PATENT OFFICE.

PETER PEARSON, OF MANCHESTER, COUNTY OF LANCASTER, ENGLAND.

APPARATUS FOR ROASTING COFFEE.

SPECIFICATION forming part of Letters Patent No. 239,269, dated March 22, 1881.

Application filed December 24, 1880. (No model.) Patented in England June 11, 1880.

*To all whom it may concern:*

Be it known that I, PETER PEARSON, a subject of the Queen of Great Britain and Ireland, and residing at Manchester, county of Lancaster, England, have invented certain Improvements in Apparatus for Roasting Coffee, (for which I have obtained a patent in Great Britain, No. 2,363, June 11, 1880,) of which the following is a specification.

This invention relates to the construction of apparatus used for roasting coffee, chicory, cereals, or other like articles required to be roasted, and applies more particularly to that class of apparatus which has hitherto been used only for roasting chicory, and which consists, principally, of a shallow revolving pan, which is placed in a chamber beneath a fire, the object of the present invention being to improve the construction and operation of such apparatus, and more especially to render it suitable for roasting coffee and other grains.

Hitherto it has not been found practicable to roast coffee or other grain by means of this apparatus, in consequence of the action of the centrifugal force throwing the grain outward toward the edge of the pan, and thus causing the inner layer (or that nearer the center) to become very thin, while the outer layer (or that near the edge of the pan) becomes proportionately thick, and hence the inner portion became over-roasted or burned before the outer portion was sufficiently roasted, and hence it was impossible to roast the coffee equally.

My improvements are designed to remedy the above-mentioned defects by, firstly, counteracting the effects of centrifugal force, so as to cause the layer of coffee or other grain to be always equally and evenly distributed over the surface of the pan; and, secondly, by preventing the burning or over-roasting of the inner layer (or that nearest the center) which would otherwise still occur, notwithstanding the evenness of the layer, in consequence of the center part of the pan moving at a less velocity than the part nearer to the circumference.

Figure 1 in the annexed drawings is a front elevation of my improved apparatus, with the door of the roasting-chamber shown as open. Fig. 2 is a plan view of the same with the top flue partly removed; and Fig. 3 is a vertical section through the line A B in Fig. 1. Fig. 4 is a plan view of the pan lid or cover detached.

$a\ a$ is the furnace, and $b\ b$ the flue, passing above the roasting-chamber $c\ c$, which is provided with doors $d\ d$. The revolving pan $e\ e$ is supported on a carriage, $f\ f$, running upon rails $g\ g$, and is caused to revolve when in the roasting-chamber by the bevel-wheel $h\ h$ falling into gear with the pinion $i\ i$, which is constantly revolving.

So far the apparatus is, as previously mentioned, similar to that sometimes used for roasting chicory; but in order to adapt the same to the purposes of my invention, I make the following modifications: In the first place, I employ in the interior of the revolving pan $e\ e$ a series of scrapers, $j\ j$, which are fixed to the cover-frame $l\ l$, and which are placed at such an angle (see Fig. 4) as will have a constant tendency, while the pan $e\ e$ is revolving, to throw the coffee or other grain toward the center, and thus the effects of the centrifugal force will be counteracted, the coffee or grain will be well stirred, and the layer kept always level and even; and, secondly, in order to prevent the burning or over-roasting of that portion of the coffee or grain which, being nearer to the center, moves at a lower velocity, I employ a ring of metal, $m\ m$, which keeps the center of the pan quite clear, and a fixed screen or cover, $l\ l$, of sheet metal, placed over the central part of the pan, which screens off a portion of the heat of the fire from the coffee or grain, by which means the whole contents of the pan are equally roasted; and it will be found in practice that not only will the coffee or other grain be more equally roasted by the use of this apparatus, but a greater proportion of the volatile parts, including the aroma, will be retained, and the weight of the coffee or other grain will not be so much reduced in roasting as by the use of the apparatus hitherto employed.

The outer portions of the screen or cover at $n\ n$ may either be left open, as shown at Fig. 4, or filled in with wire-gauze, as shown at Fig. 2, in which case a feed-opening must be provided, as at $k$.

It will be understood that the screen or cover $l\ l$ does not revolve, but is fixed to the pan-carriage $f\ f$ by the uprights $o\ o$, and that the scrapers *j j*, being fixed to the cover, are also stationary.

In order to prevent the coffee from burning by being kept continually against the ring *m m*, one or more of the scrapers *j'* immediately next to the said ring are turned in the reverse direction, and the scrapers *j'*, being close against it, will throw the coffee outward again, and thus all the coffee will be continually turned over and over.

I claim as my invention—

1. In a coffee-roasting apparatus, the combination of a rotary pan having a central ring, *m*, with a stationary frame carrying a series of scrapers set at an angle in respect to the motion of the pan to throw the grains toward the said ring, substantially as and for the purpose set forth.

2. In a coffee-roasting apparatus, the combination of a rotary roasting-pan having a central ring, *m*, with stationary scrapers *j'*, substantially as described.

3. In a coffee-roasting apparatus, the combination of a rotary roasting-pan having a central ring, *m*, with a cover-screen, *l*, about the upper edge of said ring, and adapted to screen off a portion of the heat from the contents of the pan, substantially as specified.

4. In a coffee-roasting apparatus, the combination of a rotary roasting-pan having a central ring, *m*, with a stationary frame carrying scrapers *j* and *j'*, all substantially as and for the purpose set forth.

In testimony whereof I have signed my name to this specification in the presence of two subscribing witnesses.

PETER PEARSON.

Witnesses:
GEORGE DAVIES,
CHARLES DAVIES.